(12) United States Patent
Oya et al.

(10) Patent No.: US 11,935,413 B2
(45) Date of Patent: Mar. 19, 2024

(54) VEHICLE NOTIFICATION APPARATUS

(71) Applicant: TOYOTA JIDOSHA KABUSHIKI KAISHA, Toyota (JP)

(72) Inventors: Kai Oya, Susono (JP); Shintaro Inoue, Naka-gun (JP); Fumio Sugaya, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 42 days.

(21) Appl. No.: 17/961,201

(22) Filed: Oct. 6, 2022

(65) Prior Publication Data
US 2023/0177960 A1 Jun. 8, 2023

(30) Foreign Application Priority Data
Dec. 3, 2021 (JP) ................................ 2021-196715

(51) Int. Cl.
*G08G 1/16* (2006.01)
*B60Q 9/00* (2006.01)
*G01P 15/00* (2006.01)

(52) U.S. Cl.
CPC ............. *G08G 1/162* (2013.01); *B60Q 9/008* (2013.01); *G01P 15/003* (2013.01)

(58) Field of Classification Search
None
See application file for complete search history.

(56) References Cited

U.S. PATENT DOCUMENTS

| | | |
|---|---|---|
| 6,583,403 B1 | 6/2003 | Koike et al. |
| 10,427,689 B2 | 10/2019 | Tokimasa et al. |
| 10,486,698 B2 | 11/2019 | Masui et al. |
| 10,731,996 B2 | 8/2020 | Naito |
| 10,922,561 B2 | 2/2021 | Ozawa et al. |
| 11,017,247 B2 | 5/2021 | Hayashi et al. |
| 11,072,328 B2 | 7/2021 | Masui et al. |
| 11,235,766 B2 | 2/2022 | Masui et al. |
| 11,247,671 B2 | 2/2022 | Komori |
| 2008/0143501 A1* | 6/2008 | Li .................... G01S 15/931 340/435 |
| 2011/0010040 A1* | 1/2011 | Ichinose ............... B60P 1/045 701/31.4 |
| 2020/0320313 A1* | 10/2020 | Huang ........... G08G 1/096775 |
| 2020/0326191 A1 | 10/2020 | Naito |
| 2021/0364631 A1 | 11/2021 | Hasegawa et al. |

FOREIGN PATENT DOCUMENTS

| | | | |
|---|---|---|---|
| JP | 2001-191876 A | 7/2001 | |
| WO | WO-2021138618 A1 * | 7/2021 | ............... B60R 1/22 |

* cited by examiner

*Primary Examiner* — Muhammad Adnan
(74) *Attorney, Agent, or Firm* — Oliff PLC

(57) ABSTRACT

A vehicle notification apparatus recognizes an object of driving over on a road on which a host vehicle travels based on a detection result by a front sensor of the host vehicle, determines whether the object of driving over flies backwards based on a detection result by a rear sensor of the host vehicle when the object of driving over is recognized, and notifies a following vehicle of projectile information corresponding to the flight of the object of driving over when it is determined that the object of driving over flies backwards.

8 Claims, 6 Drawing Sheets

VEHICLE NOTIFICATION APPARATUS

CROSS-REFERENCE TO RELATED APPLICATION

This application claims the benefit of priority Japanese Patent Application No. 2021-196715, filed Dec. 3, 2021, the entire contents of which are incorporated herein by reference.

TECHNICAL FIELD

The present disclosure relates to a vehicle notification apparatus.

BACKGROUND

As prior art, JP 2001-191876 A discloses a vehicle notification apparatus that determines whether a host vehicle can drive over a fallen object when the falling object is detected in front of the host vehicle.

SUMMARY

However, even in a case where it is determined that the host vehicle can drive over the fallen object, the host vehicle may send the fallen object flying backwards when it drives over the fallen object. In this case, there was a risk that the fallen object flying backwards may affect the travel of the following vehicle.

In an aspect of the present disclosure, a vehicle notification apparatus mounted on a host vehicle configured to notify a following vehicle of the host vehicle of information includes: an object of driving over recognition unit configured to recognize an object of driving over on a road on which the host vehicle travels based on a detection result by a front sensor of the host vehicle; a projectile determination unit configured to determine whether the object of driving over flies backwards based on a detection result by a rear sensor of the host vehicle when the object of driving over is recognized by the object of driving over recognition unit; and a notification unit configured to notify the following vehicle of projectile information corresponding to flight of the object of driving over when the projectile determination unit determines that the object of driving over flies backwards.

According to a vehicle notification apparatus according to an aspect of the present disclosure, when it is determined that an object of driving over has flown backwards due to being buffeted by the host vehicle driving over, projectile information corresponding to the flight of the object of driving over is notified to a following vehicle. As a result, in the vehicle notification apparatus, it is possible to suppress the effect of the object F of driving over that has flown backwards on the following vehicle.

The vehicle notification apparatus according to one aspect of the present disclosure may further include a driving over detection unit that detects that the host vehicle has ridden over the object of driving over based on vertical acceleration detected by an acceleration sensor of the host vehicle when the object of driving over is recognized by the object of driving over recognition unit, wherein the projectile determination unit determines whether the object of driving over has flown backwards when the driving over detection unit detects that the host vehicle has ridden over the object of driving over, and does not determine whether the object of driving over has flown backwards when the driving over detection unit does not detect that the host vehicle has ridden over the object of driving over.

In the vehicle notification apparatus according to an aspect of the present disclosure, the notification unit may notify the following vehicle of detailed alert information including a recognition result of the object of driving over by the object of driving over recognition unit as projectile information.

In the vehicle notification apparatus according to an aspect of the present disclosure, the notification unit may notify the following vehicle of the deceleration instruction information as projectile information.

According to each aspect of the present disclosure, it is possible to suppress an effect of an object F of driving over that has flown backwards on a following vehicle.

DETAILED DESCRIPTION

Hereinafter, embodiments of the present disclosure will be described with reference to the drawings.

Figure 1:
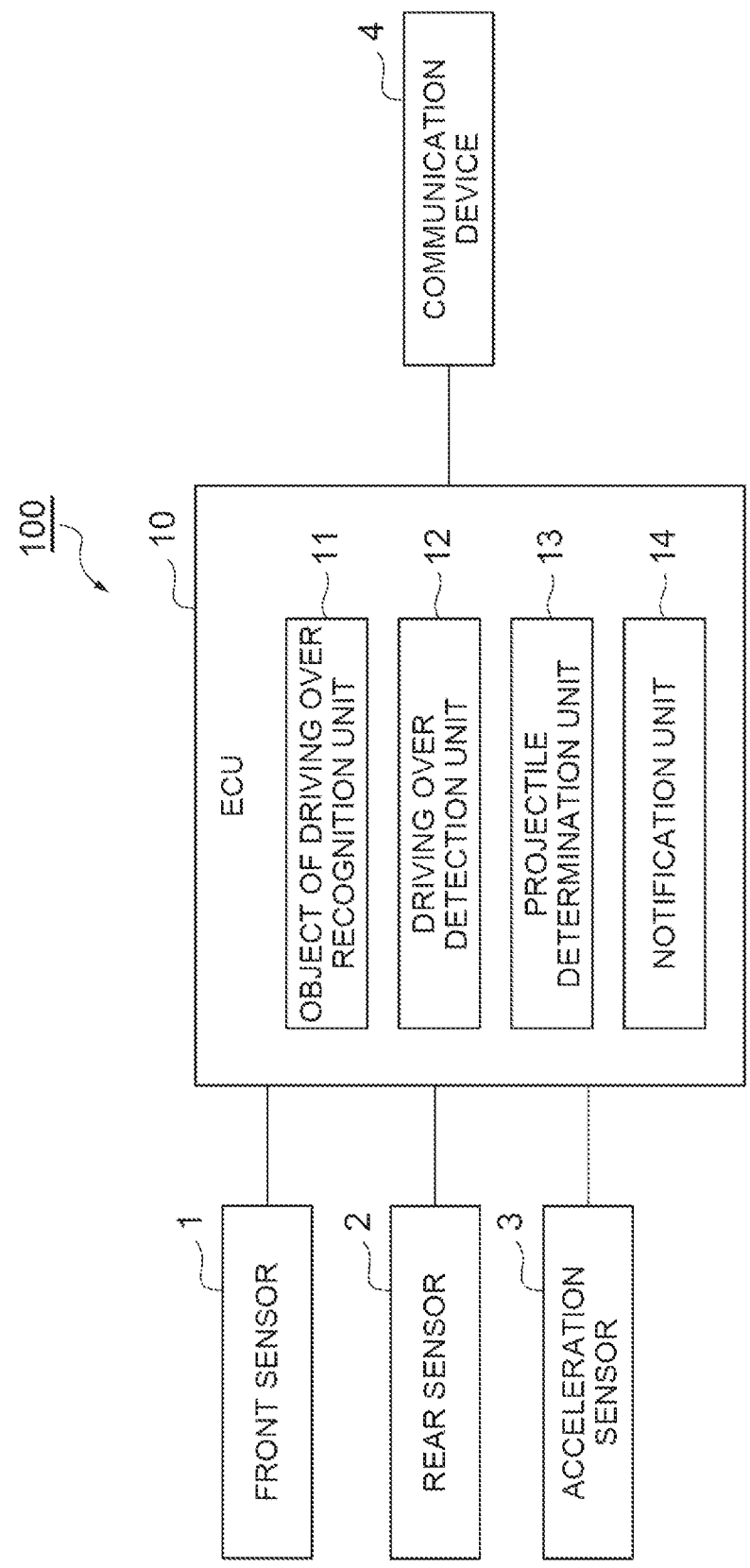
FIG. 1 is a block diagram illustrating a vehicle notification apparatus according to an embodiment.

A vehicle notification apparatus 100 illustrated in FIG. 1 is a device that is mounted in a vehicle such as a passenger car and notifies a following vehicle of a host vehicle of information. Hereinafter, vehicles in which the vehicle notification apparatus 100 are mounted are referred to as host vehicles. When the object flies backwards due to driving over by the host vehicle, the vehicle notification apparatus 100 notifies the following vehicle of projectile information corresponding to the flight of the object. The projectile information will be described in detail later. The host vehicle may be autonomous driving vehicle.

The following vehicle is a vehicle that follows the host vehicle on the same road as the host vehicle. The following vehicle may be a vehicle that travels in the same lane as the host vehicle. The following vehicle may be a vehicle that travels in a lane adjacent to the lane in which the host vehicle travels. The following vehicle may be a vehicle that is under platooning control of the host vehicle. In this case, the host vehicle does not need to be the leading vehicle of platooning. The following vehicle may perform cooperative adaptive cruise control (CACC) using inter-vehicle communication with respect to the host vehicle. However, the present invention is not limited to this.

Configuration of Vehicle Notification Apparatus

Hereinafter, the configuration of the vehicle notification apparatus 100 will be described with reference to the drawings. As illustrated in FIG. 1, the vehicle notification apparatus 100 includes an electronic control unit (ECU) 10. The ECU 10 is an electronic control unit including a central processing unit (CPU), read only memory (ROM), random access memory (RAM) and the like. In the ECU 10, for example, various functions are realized by loading a program stored in the ROM into the RAM and executing the program loaded in the RAM by the CPU. The ECU 10 may be configured with a plurality of electronic control units.

The ECU 10 are connected to a front sensor 1, a rear sensor 2, an acceleration sensor 3, and a communication device 4. The front sensor 1 is a sensor for detecting an object in front of the host vehicle. The rear sensor 2 is a sensor for detecting an object behind the host vehicle.

Each of the front sensor 1 and the rear sensor 2 may include at least one of a camera and a radar sensor. The camera is an imaging device that images the outside of the host vehicle. The camera transmits information of the captured image to the ECU 10. Objects around the host vehicle are detected by performing image recognition processing on the captured image of the camera. The camera may be a monocular camera, or may be a stereo camera.

The radar sensor is a detection device that detects obstacles around the vehicle using radio waves (for example, millimeter waves) or light. The radar sensor includes, for example, millimeter wave radar or a light detection and ranging (LIDAR). The radar sensor transmits the radio wave or light to the surroundings of the vehicle, and detects the obstacles by receiving radio waves or light reflected from obstacles. The radar sensor transmits the detected obstacle information to the ECU 10.

The acceleration sensor 3 is a detector that detects acceleration of the host vehicle. The acceleration sensor includes a vertical acceleration sensor that detects acceleration in the vertical direction of the host vehicle in addition to a longitudinal acceleration sensor that detects acceleration in the longitudinal direction of the host vehicle. The acceleration sensor transmits acceleration information of the host vehicle to the ECU 10.

The communication device 4 is a device that communicates with other vehicles. The communication device 4 has a function of performing inter-vehicle communication with the following vehicle. The communication device 4 does not need to have an inter-vehicle communication function, and may be able to communicate with a following vehicle via a roadside unit provided on the road side or various communication servers.

Next, the functional configuration of the ECU 10 will be described. As illustrated in FIG. 1, the ECU 10 has an object of driving over recognition unit 11, a driving over detection unit 12, a projectile determination unit 13, and a notification unit 14.

The object of driving over recognition unit 11 recognizes an object of driving over on a road on which the host vehicle travels based on a detection result by the front sensor 1 of the host vehicle. The detection result by the front sensor 1 is, for example, a captured image of a camera or a detection result of a radar sensor. The object of driving over is an object that the host vehicle can drive over. The object of driving over is, for example, a fallen object on a road. Overcoming objects include bottles, cans, lumber, automotive parts, and the like. The object of driving over may be limited to objects less than a certain height. The constant height may be 5 cm, 10 cm, 15 cm, or greater than or equal to 20 cm. Structures fixed with respect to the road need not be included in the object of driving over.

The object of driving over recognition unit 11 determines whether the object in front of the host vehicle is the object of driving over by image recognition processing such as pattern matching or deep learning on a captured image of a camera, for example. The object of driving over recognition unit 11 may determine whether the object in front of the host vehicle is the object of driving over based on grouping of radar reflection points and an object shape obtained by the grouping based on a detection result of the radar sensor.

Figure 2:
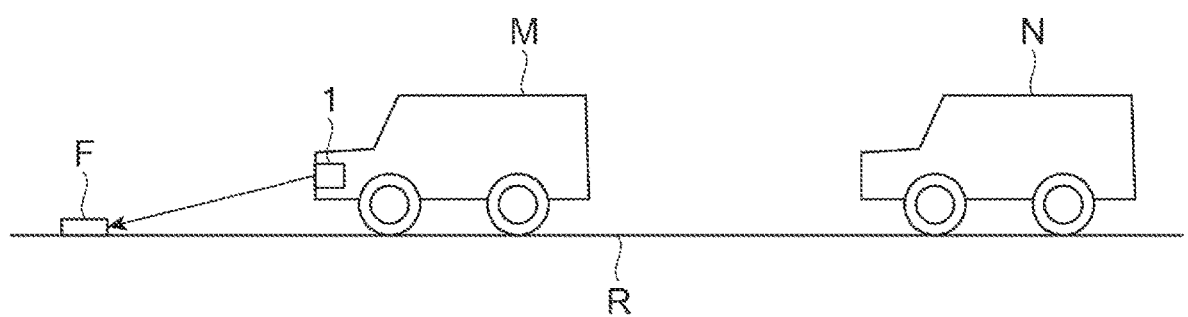
FIG. 2 is a diagram illustrating an example of a situation in which an object of driving over is present in front of a host vehicle.

Here, FIG. 2 is a diagram illustrating an example of a situation in which the object of driving over is present in front of a host vehicle. FIG. 2 illustrates a road R, a host vehicle M, a following vehicle N, and the object F on a road R in front of the host vehicle M. In the situation illustrated in FIG. 2, the object of driving over recognition unit 11 detects the object F on the road R in front of the host vehicle M by the front sensor 1. The object of driving over recognition unit 11 recognizes the object F of driving over on the road R on which the host vehicle M travels by determining that the object F is the object of driving over based on the detection result of the front sensor 1.

When the object on the road is a light object such as a plastic bag, the object of driving over recognition unit 11 may not recognize the object as the object of driving over. The lightweight object is the object that has little effect on the travel of the following vehicle N when flying toward the following vehicle N due to driving over by the host vehicle M.

When the object of driving over recognition unit 11 recognizes the object F of driving over, the driving over detection unit 12 detects that the host vehicle M drives over the object F of driving over based on the vertical acceleration detected by the acceleration sensor 3 of the host vehicle M.

Figure 3A:
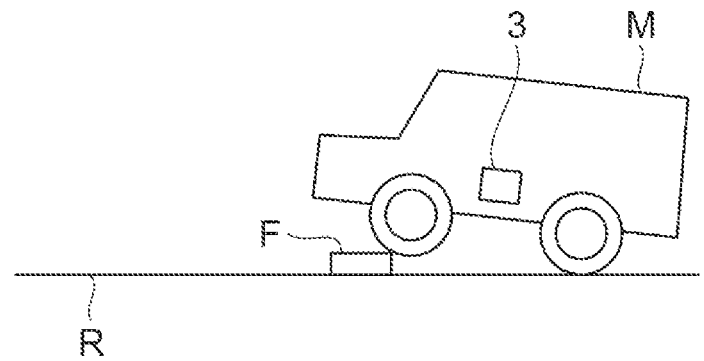
FIG. 3A is a diagram illustrating an example of a situation in which the front wheel of the host vehicle drives over the object.
Figure 3B:
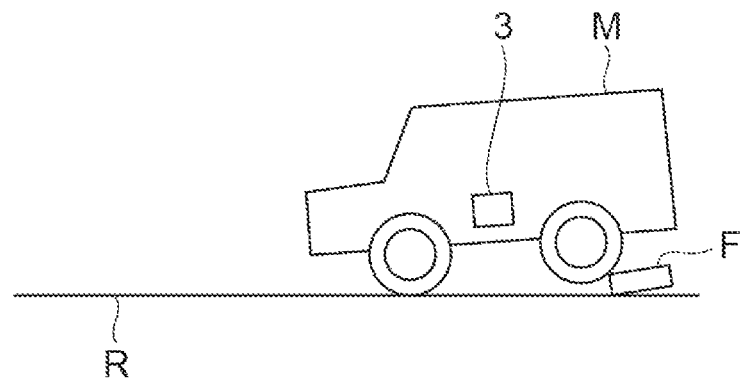
FIG. 3B is a diagram illustrating an example of a situation in which the rear wheel of the host vehicle drives over the object.

Here, FIG. 3A is a diagram illustrating an example of a situation in which the front wheel of the host vehicle M drives over the object F of driving over. FIG. 3B is a diagram illustrating an example of a situation in which the rear wheel of the host vehicle M drives over the object F of driving over. As illustrated in FIG. 3A and FIG. 3B, when the front wheel and the rear wheel of the host vehicle M drive over the object F of driving over, the host vehicle M moves in the vertical direction.

Figure 4:
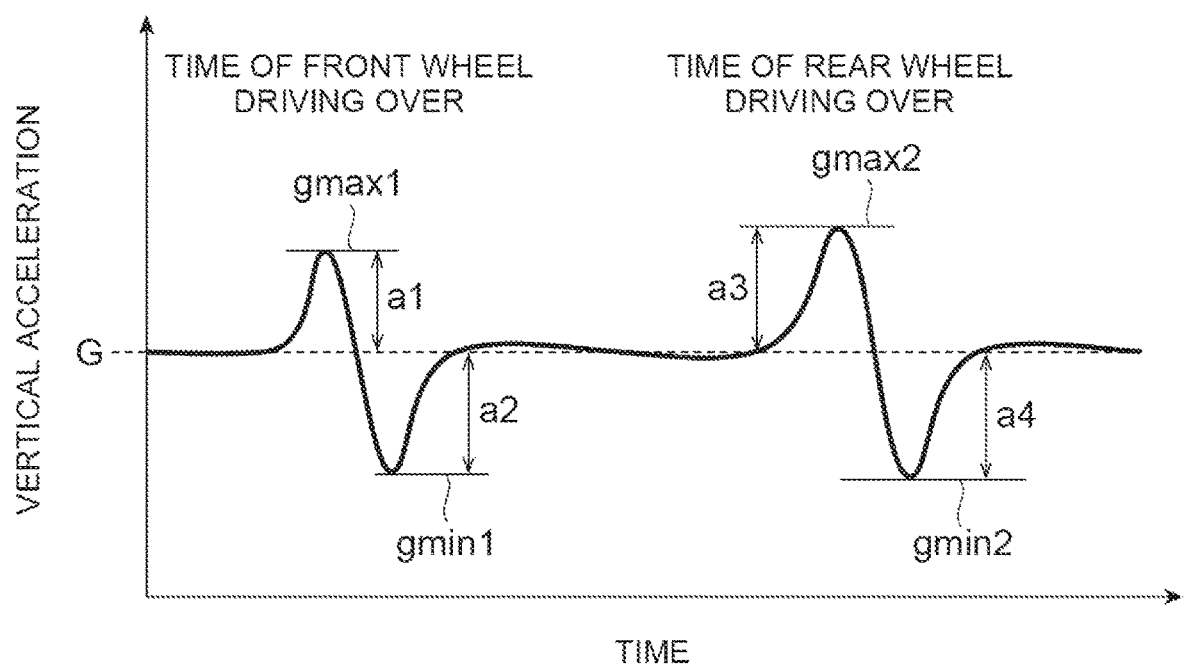
FIG. 4 is a graph illustrating an example of temporal changes in the vertical acceleration of the host vehicle when the host vehicle drives over the object.

FIG. 4 is a graph illustrating an example of temporal changes in vertical acceleration of the host vehicle M at the time of driving over the host vehicle M. The vertical axis of FIG. 4 is the vertical acceleration of the host vehicle M, and the horizontal axis is time. FIG. 4 indicates a reference acceleration G serving as a reference of vertical acceleration, a maximum vertical acceleration gmax1 at the time of the front wheel driving over, a minimum vertical acceleration gmin1 at the time of the front wheel driving over, a difference a1 of the reference acceleration G and the maximum vertical acceleration gmax1, and a difference a2 of the reference acceleration G and the minimum vertical acceleration gmin1. The reference acceleration G is, for example, vertical acceleration during traveling on a plane. FIG. 4 indicates a maximum vertical acceleration gmax2 at the time of the rear wheel driving over, a minimum vertical acceleration gmin2 at the time of the rear wheel driving over, a difference b1 between the reference acceleration G and the maximum vertical acceleration gmax2, and a difference b2 between the reference acceleration G and the minimum vertical acceleration gmin2.

When the driving over detection unit 12 detects a change in the vertical acceleration of the host vehicle M as illustrated in FIG. 4, it detects that the host vehicle M drives over the object F of driving over. As an example, the driving over detection unit 12 detects peaks of vertical acceleration corresponding to the maximum vertical acceleration $gmax1$ and the minimum vertical acceleration $gmin1$ within a predetermined time. When the sum of the difference a1 and the difference a2 in the detected peak is equal to or greater than a certain threshold value, the driving over detection unit 12 determines that the front wheel of the host vehicle M has driven over the object F of driving over. Similarly, the driving over detection unit 12 determines that the rear wheel of the host vehicle M drives over the object F of driving over. When it is determined that the rear wheel of the host vehicle M drives over the object F of driving over, the driving over detection unit 12 detects drives over the object F of driving over by the host vehicle M.

Note that the method of detecting driving using vertical acceleration is not limited to the method described above. The driving over detection unit 12 may detect driving over the object F of driving over by the host vehicle M when peaks of vertical acceleration respectively corresponding to the front wheel driving over and the rear wheel driving over are detected within a predetermined time after the object F of driving over is recognized by the object of driving over recognition unit 11.

The projectile determination unit 13 determines whether the object F of driving over flies backwards based on the detection result by the rear sensor 2 of the host vehicle M when the driving over detection unit 12 detects that the host vehicle M driving over the object F of driving over. The detection result by the rear sensor 2 is, for example, a captured image of a camera or a detection result of a radar sensor.

Figure 5A:
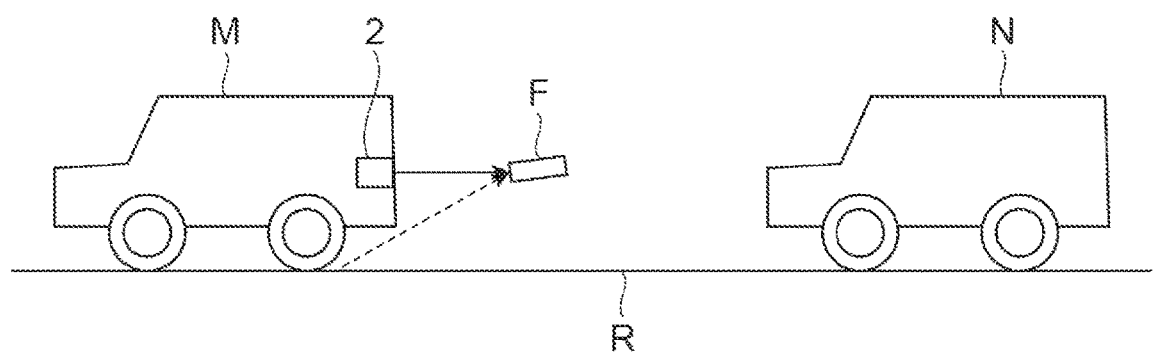
FIG. 5A is a diagram illustrating an example of a situation in which an object of driving over has flown backwards.

FIG. 5A is a diagram illustrating an example of a situation in which the object of driving over has flown backwards. The projectile determination unit 13 determines that the object F of driving over has flown backwards in the situation illustrated in FIG. 5A. The projectile determination unit 13 determines that the object F of driving over flies backwards when it is determined that the speed of the object F of driving over present in the air behind the host vehicle M is equal to or higher than a predetermined speed based on, for example, a captured image of a camera or a detection result of a radar sensor.

Figure 5B:
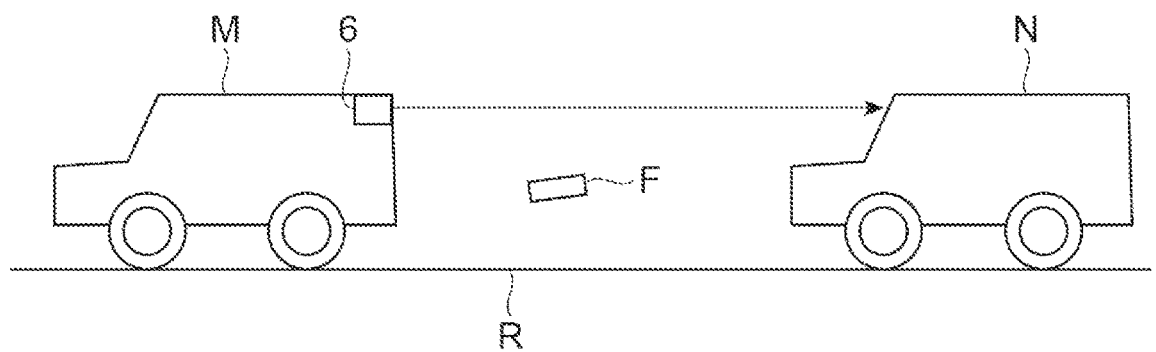
FIG. 5B is a diagram illustrating an example of a situation in which the following vehicle is notified of projectile information.

When the projectile determination unit 13 determines that the notification unit 14 has flown backwards, the projectile unit notifies the following vehicle N of the projectile information corresponding to the object F of driving over of the object F of driving over. The notification unit 14 notifies the following vehicle N of projectile information by inter-vehicle communication using, for example, the communication device 4. FIG. 5B is a diagram illustrating an example of a situation in which the following vehicle is notified of the projectile information.

The projectile information includes, for example, attention-calling information related to the object flying backwards. The following vehicle N executes at least one of alert to the driver, automatic deceleration, and automatic steering avoidance based on the alert information.

The projectile information may include detailed alert information including a recognition result of the object F of driving over by the object of driving over recognition unit 11. The recognition result of the object F of driving over may include information on the type of the object F of driving over. The recognition result of the object F of driving over may include information on the size of the object F of driving over. The type of the object F of driving over is a can, a bottle, a plate material, or the like. The projectile information may include information on the projectile speed of the object F of driving over.

The projectile information may be deceleration instruction information for the following vehicle N. In this case, the projectile unit does not need to receive information about the following vehicle N of the object. Also, the following vehicle N does not need to make a determination regarding the object. The deceleration instruction information may include information instructing winding of a seat belt of an occupant of the following vehicle, switching on or blinking of a brake lamp, and switching on of a hazard lamp.

The notification unit 14 may calculate the deceleration to be instructed to the following vehicle N based on the inter-vehicle distances between the host vehicle M and the following vehicle N and the vehicle speed of the following vehicle N. The notification unit 14 may calculate the deceleration to be instructed to the following vehicle N based on the recognition result of the object F of driving over by the object of driving over recognition unit 11. The notification unit 14 may calculate the deceleration instructed to the following vehicle N based on the object F of driving over speed of the projectile unit.

The notification unit 14 may calculate the risk degree from the recognition result of the object F of driving over, and may notify the following vehicle N of the deceleration instruction information when the risk degree is equal to or greater than a predetermined threshold value. When the degree of risk is less than a certain threshold value, the notification unit 14 notifies the following vehicle N of alert information or detailed alert information. The risk degree has a higher value as the size of the object F of driving over is larger, for example. The notification unit 14 may calculate the degree of risk based on the projectile direction of the object F of driving over. The risk degree has a small value when a projectile direction of the object F of driving over is a direction away from the following vehicle N. The direction away from the following vehicle N is, for example, a direction away from the road.

The method of notifying the following vehicle N is not limited to inter-vehicle communication. The notification unit 14 may notify the following vehicle N via a roadside unit installed on the road. The notification unit 14 may notify the following vehicle N via a server.

When an external speaker is mounted on the host vehicle M, the notification unit 14 may notify the following vehicle N of projectile information by sound. When the host vehicle M display is mounted on the rear unit, the notification unit 14 may notify the following vehicle N of the projectile information by display control of the rear display. The rear display may be a head-up display using a rear window glass of the host vehicle M.

Processing Method of Vehicle Notification Apparatus

Figure 6:
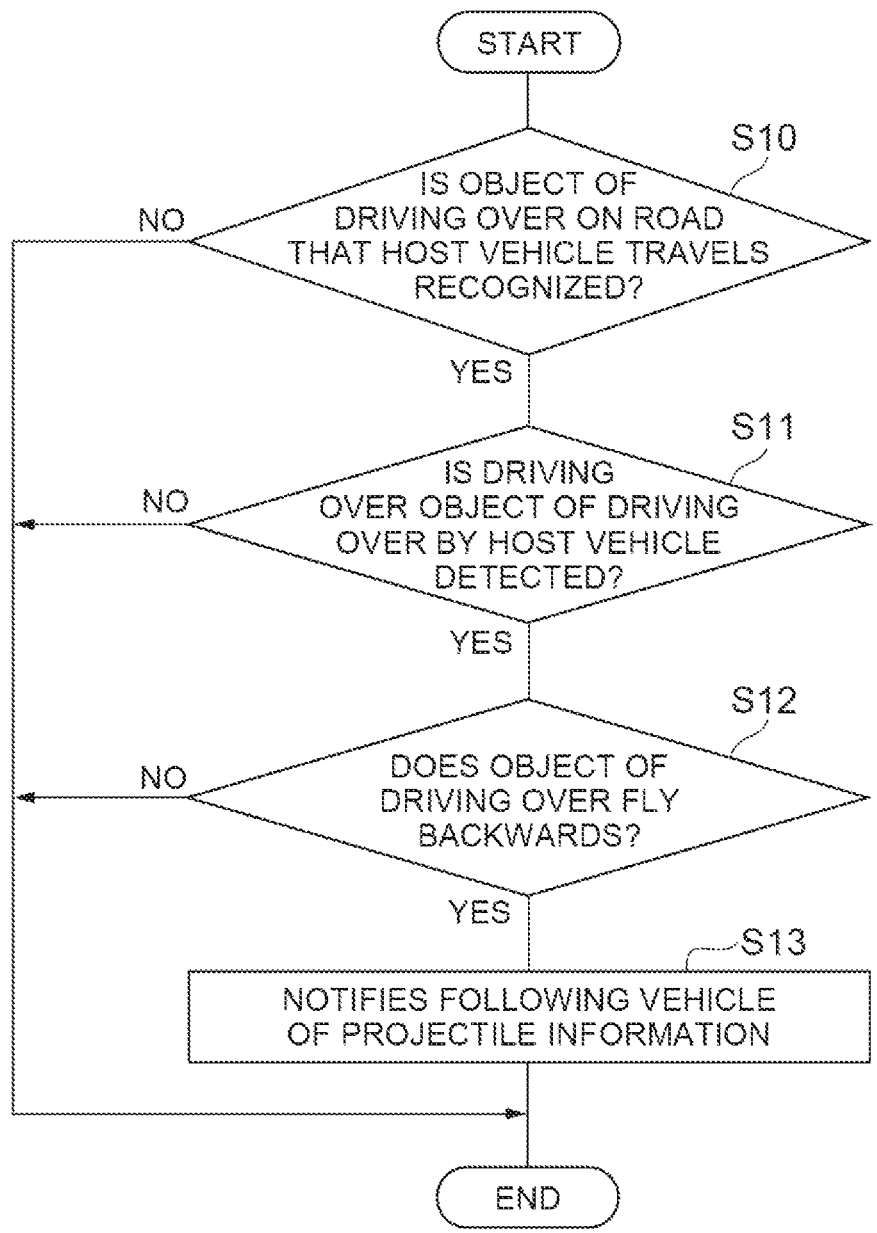
FIG. 6 is a flowchart illustrating an example of projectile information notification processing.

Next, the processing of the vehicle notification apparatus 100 according to the present embodiment will be described with reference to FIG. 6. FIG. 6 is a flowchart illustrating an example of projectile information notification processing. The projectile information notification processing is executed while the host vehicle M is traveling, for example. The projectile information notification processing may be executed when there is a following vehicle N connected by inter-vehicle communication.

As illustrated in FIG. 6, the ECU 10 of the vehicle notification apparatus 100 determines whether the object F of driving over on the road R on which the host vehicle M travels is recognized by the object of driving over recognition unit 11 as S10. The object of driving over recognition unit 11 recognizes the object F of driving over based on the detection result by the front sensor 1 of the host vehicle. When it is determined that the object F of driving over is recognized (YES in S10), the ECU 10 transitions to S11. When it is not determined that the object F of driving over is recognized (NO in S10), the ECU 10 ends the projectile information notification processing.

In S11, the ECU 10 determines whether the driving over the object F of driving over by the host vehicle M is detected by the driving over detection unit 12. The driving over detection unit 12 detects that the host vehicle M drives over the object F of driving over based on the vertical acceleration detected by the acceleration sensor 3 of the host vehicle M. When it is determined that the driving over the object F of driving over by the host vehicle M is detected (YES in S11), the ECU 10 transitions to S12. When it is not determined that the driving over the object F of driving over by the host vehicle M is detected (NO in S11), the ECU 10 ends the projectile information notification processing.

In S12, the ECU 10 determines whether the object F of driving over flies backwards by the projectile determination unit 13. The projectile determination unit 13 determines whether the object F of driving over flies backwards based on the detection result of the host vehicle M by the rear sensor 2. When it is determined that the object F of driving over flies backwards (YES in S12), the ECU 10 transitions to S13. When it is not determined that the object F of driving over flies backwards (NO in S12), the ECU 10 ends the projectile information notification processing.

In S13, the ECU 10 notifies the following vehicle N of projectile information by the notification unit 14. The notification unit 14 notifies the following vehicle N of projectile information by inter-vehicle communication using, for example, the communication device 4. Thereafter, the ECU 10 ends the projectile information notification processing.

According to the vehicle notification apparatus 100 according to the present embodiment described above, when the object F of driving over on the road R on which the host vehicle M travels is recognized and it is determined that the object F of driving over flies backwards due to being buffeted by the host vehicle M driving over, projectile information corresponding to the flight of the object F of driving over is notified to the following vehicle N. Therefore, it is possible to suppress the effect of the object F of driving over flying backwards on the following vehicle N.

Further, according to the vehicle notification apparatus 100, when the driving over detection unit 12 does not detect that the host vehicle M drives over the object F of driving over, it is not determined whether the object F of driving over flies backwards. Therefore, it is possible to avoid performing the projectile determination even when the host vehicle M does not drive onto the object F of driving over, and to avoid erroneously determining that a plastic bag or the like flying backwards in the wind is the object F of driving over.

Further, according to the vehicle notification apparatus 100, by notifying the following vehicle N of detailed alert information including the recognition result of the object F of driving over, the following vehicle N can determine avoidance or deceleration based on the recognition result of the object F of driving over, and the effect of the object F of driving over on the following vehicle N can be suppressed.

In addition, according to the vehicle notification apparatus 100, by notifying the following vehicle N of the deceleration instruction information as the projectile information, it is possible to reduce the possibility that the object F of driving over comes into contact with the following vehicle N due to rapid deceleration of the following vehicle N.

Although embodiments of the present disclosure have been described above, the present disclosure is not limited to the above-described embodiments. The present disclosure can be implemented in various forms in which various changes and modifications are made based on the knowledge of those skilled in the art, including the above-described embodiments.

The driving over detection unit 12 does not necessarily need to detect that the host vehicle M climbs over the object F of driving over by using the vertical acceleration of the host vehicle M. The driving over detection unit 12 may detect that the host vehicle M climbs over the object F of driving over by the bottom sensor of the host vehicle M, for example. The bottom sensor is a detector that is provided between the front wheel and the rear wheel at the bottom of the host vehicle M and detects an object below the host vehicle M. Bottom refers to the lower surface of the host vehicle M. The bottom sensor may be a camera, a radar sensor, or a sonar sensor. The bottom sensors may be provided on the left and right of the host vehicle M and behind the front wheels so as to correspond to the left and right tires. The driving over detection unit 12 may detect that the object F of driving over has been surmounted by the host vehicle M when the object F of driving over is detected below the host vehicle M by the bottom sensor.

The vehicle notification apparatus 100 does not necessarily have to include the driving over detection unit 12. When the projectile determination unit 13 recognizes the object F of driving over on the road R on which the host vehicle M travels by the object of driving over recognition unit 11, the projectile unit may determine whether the object F of driving over has flown backwards due to driving over the object F of driving over by the host vehicle M.

The vehicle notification apparatus 100 may notify the following vehicle N of the avoidance steering instruction information as the projectile information of the notification unit 14. The avoidance steering instruction information includes information for instructing the following vehicle N to perform avoidance steering in the left direction or the right direction.

What is claimed is:

1. A vehicle notification apparatus mounted on a host vehicle and configured to notify a following vehicle of the host vehicle of information, the vehicle notification apparatus comprising:
   an object of driving over recognition unit configured to recognize an object of driving over on a road on which the host vehicle travels based on a detection result of a front sensor of the host vehicle;
   a projectile determination unit configured to determine whether the object of driving over flies backwards based on a detection result of a rear sensor of the host vehicle when the object of driving over is recognized by the object of driving over recognition unit; and
   a notification unit configured to notify the following vehicle of projectile information corresponding to the flight of the object of driving over when the projectile determination unit determines that the object of driving over has flown backwards.

2. The vehicle notification apparatus according to claim 1, further comprising:
   a driving over detection unit configured to detect that the host vehicle drives over the object of driving over based on vertical acceleration detected by an acceleration sensor of the host vehicle when the object of driving over is recognized by the object of driving over recognition unit,
wherein the projectile determination unit determines whether the object of driving over has flown backwards when the driving over detection unit detects that the host vehicle has driven over the object of driving over, and does not determine whether the object of driving over has flown backwards when the driving over detection unit does not detect that the host vehicle has driven over the object of driving over.

3. The vehicle notification apparatus according to claim 2,
wherein the notification unit notifies the following vehicle of detailed alert information including a recognition result of the object of driving over by the object of driving over recognition unit as the projectile information.

4. The vehicle notification apparatus of claim 3,
wherein the notification unit notifies the following vehicle of a deceleration instruction as the projectile information.

5. The vehicle notification apparatus of claim 2,
wherein the notification unit notifies the following vehicle of a deceleration instruction as the projectile information.

6. The vehicle notification apparatus according to claim 1,
wherein the notification unit notifies the following vehicle of detailed alert information including a recognition result of the object of driving over by the object of driving over recognition unit as the projectile information.

7. The vehicle notification apparatus of claim 6,
wherein the notification unit notifies the following vehicle of a deceleration instruction as the projectile information.

8. The vehicle notification apparatus of claim 1,
wherein the notification unit notifies the following vehicle of a deceleration instruction as the projectile information.

* * * * *